July 7, 1953 — A. P. CAPITANI — 2,644,363

REARVIEW MIRROR FOR MOTOR VEHICLES

Filed Feb. 8, 1950

INVENTOR.
Arnold P. Capitani
BY
*A. E. Wilson*
Attorney.

Patented July 7, 1953

2,644,363

UNITED STATES PATENT OFFICE 2,644,363

REARVIEW MIRROR FOR MOTOR VEHICLES

Arnold P. Capitani, Detroit, Mich.

Application February 8, 1950, Serial No. 142,990

3 Claims. (Cl. 88—93)

This invention relates to rear view mirrors for motor vehicles, and more particularly to a rear view mirror having a position control member extending inside the vehicle so that the position of the mirror can be readily adjusted from inside the vehicle.

It is customary to employ rear view mirrors to enable the driver of a vehicle to observe traffic and road conditions behind the vehicle. Generally speaking the most satisfactory rear view mirrors are those that are mounted on the sides of the vehicle. It is frequently necessary to adjust the position of such mirror as to prevent the reflection of lights from shining in the driver's eyes, or to properly position the mirror for drivers of different stature. It is difficult, and in many instances impossible for a driver to make the desired adjustments in the position of such mirrors while seated in the driver's compartment of a vehicle.

An object of this invention is to provide a rear view mirror assembly having a mirror position adjusting mechanism projecting into the passenger compartment of a motor vehicle whereby the position of the mirror may be adjusted from inside the vehicle.

A further object is to provide an improved rear view mirror for a motor vehicle which may be more readily adjusted than mirrors heretofore used.

Another object resides in the provision of a novel rear view mirror having improved means for varying the position of the mirror horizontally, vertically and angularly.

Still another object of the invention is to provide an improved rear view mirror that can be manufactured economically for installation on all types of vehicles.

Other objects and advantages of this invention will be apparent from the following description considered in connection with the accompanying drawings, submitted for purposes of illustration and wherein.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figure 1:
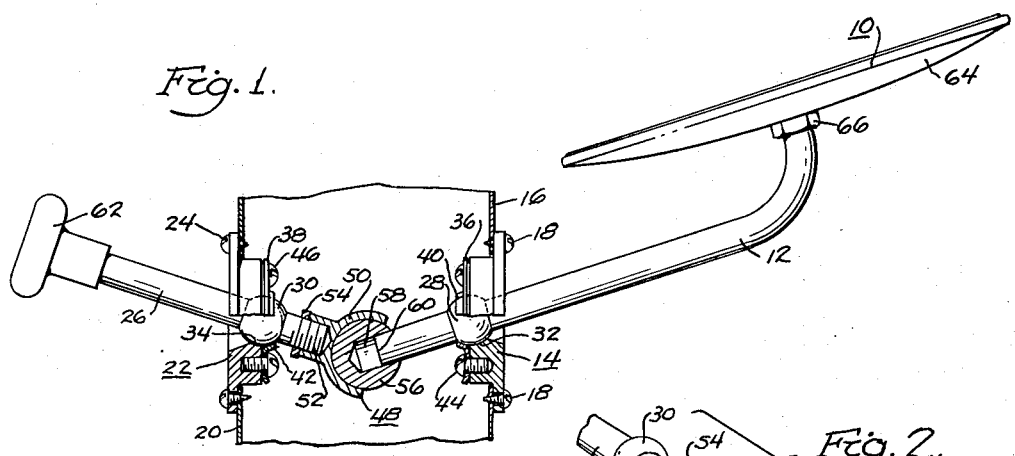
Fig. 1 is side elevation, partly in section of a rear view mirror embodying my invention.
Figure 2:
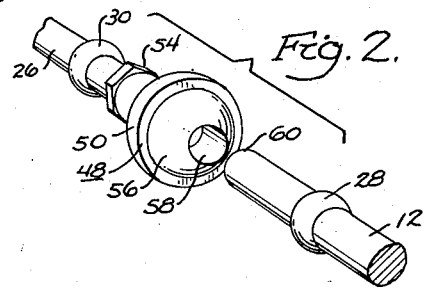
Fig. 2 is an exploded view of the central portion of Fig. 1 embodying the motion transmitting means thereof.

Referring now more particularly to Figs. 1 and 2, a rear view mirror 10 is secured to a supporting arm 12 projecting into a bracket 14 secured to an outer side panel 16 of a motor vehicle by fastening means such as screws 18. The outer panel 16 may be the panel of a door or the side of the vehicle, and is spaced from an inner panel 20. Another bracket 22 is secured to the inner panel 20 in any desired manner as by screws 24 to receive a mirror position adjusting member 26 extending into the passenger compartment of a motor vehicle.

The mirror supporting arm 12 and the adjusting member 26 have spherical portions 28 and 30 respectively adapted to project into rounded seats 32 and 34 in the brackets 14 and 22. Clamping members 36 and 38 having spring fingers 40 and 42 adapted to engage the spherical members 28 and 30 of the arm 12 and member 26 are secured to the brackets 14 and 22 by any convenient fastening means such as screws 44 and 46. The spring fingers 40 and 42 exert a desired degree of tension on the arm 12 and member 26 to hold them in any adjusted position to which they are moved.

It will of course be apparent that the spherical members 28 and 30 may be secured to the mirror supporting arm 12 and the adjusting member 26 in any desired manner as by fixing a furl thereto by any convenient fusing operation, or by upsetting and finishing operations.

The mirror supporting arm 12 and the mirror adjusting member 26 may be interconnected by any convenient motion transmitting means such for example as the ball and socket connector 48. The connector 48 includes a socket member 50 threaded on the member 26 as illustrated at 52 to permit axial adjustment of the distance between the spherical members 28 and 30 to compensate for variations in the spacings of outer and inner panels 16 and 20 of different vehicles. A locking device 54 threaded on the member 26 is provided to abut the end of the member 50 to prevent unintentional movement of the socket member 50 on the member 26.

The socket member 50 encircles a ball member 56 to such an extent as to retain it in assembled relation therewith but to permit oscillating movement of the ball 56 within the socket member 50. The ball 56 has an aperture 58 to receive the inner end 60 of the mirror supporting arm 12. It will be apparent that when the members 12 and 26 are shifted out of alignment as illustrated in Fig. 1 the inner end 60 of the arm 12 moves outwardly in the aperture 58 as illustrated. When the members 12 and 26 are shifted into alignment the inner end 60 of the arm 12 of course projects further into the aperture 60 of the ball 56.

The operation is as follows. The inner end of the mirror adjusting member 26 projecting into the passenger compartment of the vehicle is provided with a knob 62 by which it may be readily actuated to vary the position of the mirror 10. It will of course be apparent that to move the mirror 10 in one direction the knob 62 of the member 26 is moved in the direction in which it is desired to move the mirror 10. The angularity of the mirror 10 about the longitudinal axis of the supporting arm 12 may be varied by moving the knob 62 at the inner end of the member 26 in a conical path about the spherical member 30, and then returning the mirror 10 to the desired horizontal and vertical adjusted position. It will thus be apparent that by manipulation of the knob 62 from within the passenger compartment of the vehicle it is possible to readily move the mirror 10 to any desired position horizontally, vertically and angularly.

The axial adjustment between the socket member 50 and the threaded member 52 of the member 26 is sufficient to compensate for irregularities in the distance between the outer panel 16 and the inner panel 20 of any given make and model of vehicle. To accommodate this embodiment of my improved rear view mirror to any particular model of a vehicle, the arm 12 and the member 26 are proportioned in such a manner that when the members 12 and 26 are aligned with the brackets 14 and 22 in the panels 16 and 20, the end 60 of the arm 12 extends nearly to the bottom of the aperture 58 in the ball 56. It will of course be apparent that a relatively few combinations of lengths of the members 12 and 26 are sufficient to accommodate my rear view mirror to virtually all makes and models of vehicles. Also it will be apparent that arms 12 having relatively long extensions from the spherical member 28 and the end 60 may be cut off to the appropriate lengths to fit any desired model of a particular vehicle.

The mirror 10 may be secured to the supporting arm 12 in any desired manner as by threaded means projecting into the shell 64 of the mirror, a lock nut 66 being provided to prevent relative movement between the arm 12 and the shell 64. It will of course be apparent that if desired the mirror 10 may be secured to the arm 12 by means of a universal connection to permit manual adjustment of the angular relation of the mirror 10 and the arm 12.

Figure 3:
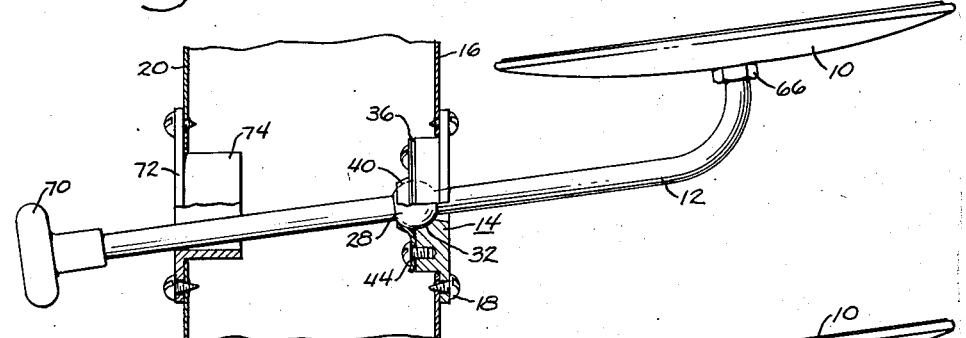
Fig. 3 is a view similar to Fig. 1 disclosing a modified form of the invention.

In the embodiment of the invention illustrated in Fig. 3, the mirror supporting arm 12 is extended through the inner panel 20 into the passenger compartment of the vehicle, a knob 70 being attached thereto to permit adjusting the horizontal, vertical and angular positions of the mirror 10.

It will be noted that the inner panel 20 is provided with a plate 72 having an inwardly directed cylinder 74 to substantially shield the space between the inner and outer panels 20 and 16 from view from the passenger compartment of the vehicle.

In the operation of this embodiment of the invention to move the mirror 10 in one direction the knob 70 in the passenger compartment is moved in the opposite direction, the arm 12 pivoting about the spherical portion 28 in the seat 32, the spring fingers 40 holding the mirror 10 in any position to which it is moved. To adjust the mirror angularly it is only necessary to rotate the knob 70 and arm 12 in the bracket 14 to position the mirror 10 in the desired angular relation.

Figure 4:
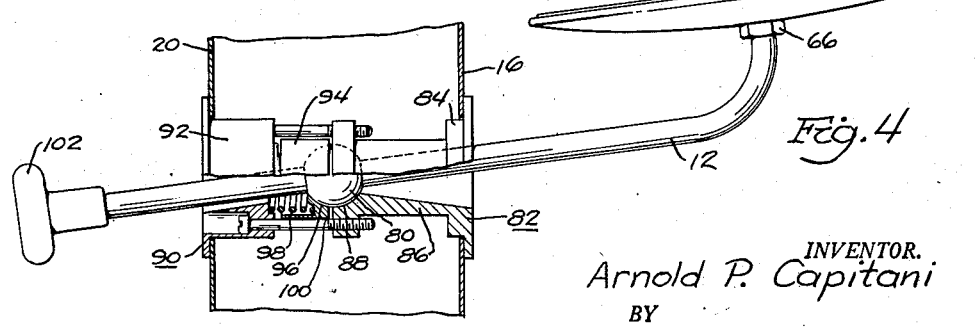
Fig. 4 is a view similar to Fig. 3 disclosing a still further modified form.

In the embodiment of the invention illustrated in Fig. 4 the mirror supporting arm 12 has a spherical member 80 adapted to be positioned approximately midway between the outer and inner panels 16 and 20. The outer panel 16 has an aperture to receive a bracket 82 having a section 84 to project through the aperture to locate the bracket in the panel. The bracket 82 has an extension 86 terminating in a seat 88 to receive the spherical member 80. The inner panel 20 also has an aperture aligned with the aperture in the outer panel 16 to receive a cooperating bracket 90 having a cylinder 92 projecting through and guided in the aperture. The inner bracket 90 has a member 94 having a spherical seat 96 yieldingly urged by a spring 98 into holding engagement with the spherical member 86 of the arm 12. The outer and inner bracket members 82 and 90 are secured together by studs 100 in rattle free engagement with the panels 16 and 20.

The operation of this embodiment is similar to that of Fig. 3, the knob 102 being manipulated in the passenger compartment to position the mirror 10 in the desired position. The spring 98 urges the spherical seat 96 of the member 94 into contact with the spherical member 80 to hold the mirror 10 in any position to which it is moved.

While the invention has been described with particular reference to several embodiments thereof, it is to be understood that the construction may be modified without departing from the spirit of my invention.

I claim:

1. In a rear view mirror assembly for a motor vehicle having outer and inner side panels, spaced brackets secured in the outer and inner side panels, a rear view mirror, a mirror supporting arm extending through the bracket in the outer panel, a mirror position adjusting member extending through the bracket in the inner panel, the mirror supporting arm and the mirror position adjusting member each having a spherical portion nesting in a seat formed in each of the brackets for universal movement therein, motion transmitting means between the mirror supporting arm and the position adjusting member comprising relatively movable ball and socket members, the socket member having an extension adjustably threaded to the end of one of said mirror supporting and position adjusting members and the ball floatingly mounted in said socket having a bore to receive the end of the other of said mirror supporting and position adjusting members, and locking means to clamp the extension of the socket member in adjusted positions on one of said mirror supporting and position adjusting members to compensate for variations in the distance between the outer and inner side panels, the mirror carrying arm extending through the outer panel being adjusted angularly when the mirror position adjusting member extending through the inner panel is moved angularly about its support in the bracket in the inner panel.

2. In a rear view mirror assembly for a motor vehicle having outer and inner side panels, spaced brackets positioned in the outer and inner side panels, a rear view mirror, a mirror supporting arm extending through the bracket in the outer panel, a mirror position adjusting member extending through the bracket in the inner panel, the mirror supporting arm and the mirror position adjusting member each being mounted for limited universal movement in its respective bracket, motion transmitting means between the mirror supporting arm and the mirror position adjusting member comprising relatively movable members, one of said relatively movable members being threaded to the end of one of said mirror supporting and position adjusting members and the other of the relatively movable members being adapted to receive the end of the other of said mirror supporting and position adjusting members, and locking means to clamp one of said relatively movable members in an adjusted position on one of said mirror supporting and position adjusting members to compensate for variations in the distance between the outer and inner side panels, the mirror carrying arm extending through the outer panel being adjusted angularly when the mirror position adjusting member extending through the inner panel is moved angularly about its support in the bracket in the inner panel.

3. In a rear view mirror assembly for a motor vehicle having outer and inner side panels, spaced brackets carried by the outer and inner side panels, a rear view mirror, a mirror supporting arm extending through the bracket in the outer panel, a mirror position adjusting member extending through the bracket in the inner panel, the mirror supporting arm and the mirror position adjusting member each being angularly movable in its respective bracket, motion transmitting means comprising relatively movable members interposed between the mirror supporting arm and the mirror position adjusting member, adjustable means between the mirror supporting arm and the mirror position adjusting member to compensate for variations in the distance between the outer and inner side panels, and locking means to lock the adjustable means in adjusted positions, the mirror carrying arm extending through the outer panel being adjusted angularly when the mirror position adjusting member extending through the inner panel is moved angularly about its support in the bracket in the inner panel.

ARNOLD P. CAPITANI.

References Cited in the file of this patent

UNITED STATES PATENTS

| Number | Name | Date |
|---|---|---|
| 1,364,268 | Fletcher | Jan. 4, 1921 |
| 1,684,695 | Draper | Sept. 18, 1928 |
| 2,281,234 | Clark et al. | Apr. 28, 1942 |
| 2,551,243 | Campbell | May 1, 1951 |

FOREIGN PATENTS

| Number | Country | Date |
|---|---|---|
| 458,196 | Germany | Mar. 31, 1928 |